US007864731B2

(12) United States Patent
Forsberg

(10) Patent No.: US 7,864,731 B2
(45) Date of Patent: Jan. 4, 2011

(54) SECURE DISTRIBUTED HANDOVER SIGNALING

(75) Inventor: Dan Forsberg, Helsinki (FI)

(73) Assignee: Nokia Corporation, Espoo (FI)

( * ) Notice: Subject to any disclaimer, the term of this patent is extended or adjusted under 35 U.S.C. 154(b) by 867 days.

(21) Appl. No.: 11/616,337

(22) Filed: Dec. 27, 2006

(65) Prior Publication Data

US 2007/0171871 A1 Jul. 26, 2007

Related U.S. Application Data

(60) Provisional application No. 60/755,793, filed on Jan. 4, 2006.

(51) Int. Cl.
*H04W 4/00* (2009.01)
(52) U.S. Cl. ................. 370/331; 455/436; 455/437; 370/310
(58) Field of Classification Search ............ 370/331; 455/436
See application file for complete search history.

(56) References Cited

U.S. PATENT DOCUMENTS

| | | | |
|---|---|---|---|
| 7,079,499 B1 * | 7/2006 | Akhtar et al. ............... 370/310 |
| 2002/0066011 A1 | 5/2002 | Vialen et al. |
| 2004/0228491 A1 | 11/2004 | Wu |
| 2005/0282548 A1 * | 12/2005 | Kim et al. .................... 455/436 |
| 2006/0083200 A1 * | 4/2006 | Emeott et al. ............... 370/331 |
| 2006/0285519 A1 * | 12/2006 | Narayanan et al. .......... 370/331 |
| 2007/0060127 A1 * | 3/2007 | Forsberg ..................... 455/436 |

FOREIGN PATENT DOCUMENTS

WO 03004335 A1 5/2003

OTHER PUBLICATIONS

International Search Report for Application No. PCT/IB2006/003793, mailed Jun. 26, 2007, 5 pages.
Ulrike Meyer and Susanne Wetzel, "On the Impact of GSM Encryption and Man-In-The-Middle Attacks on the Security of Interoperating GSM/UMTS Networks", Personal, Indoor and Mobile Radio Communications, 2004; 15th IEEE International Symposium on; vol. 4, Sep. 5-8, 2004, pp. 2876-2883.
3GPP TS 33.102 V7.0.0 (2005-12); Technical Specification; 3rd Generation Partnership Project; Technical Specification Group Services and System Aspects; 3G Security; Security architecture (Release 7), sections 6.8.4-6.8.9 and abstract, pp. 46-51.
PCT Notification Concerning Transmittal of International Preliminary Report on Patentability (Chapter I of the Patent Cooperation Treaty), International Application No. PCT/IB2006/003793, mailed Jul. 17, 2008, 8 pages.

* cited by examiner

*Primary Examiner*—David Q Nguyen
(74) *Attorney, Agent, or Firm*—Banner & Witcoff, Ltd.

(57) ABSTRACT

Provided are apparatuses and methods for providing security measures for a handover execution procedure in a communication network. In one example, the handover procedure is initiated by more than one base station. In another example, a base station may not launch a Denial or Service (DoS) attack towards other base stations or towards a core network using handover signaling messages. For example, a user device may send at least one encryption parameter, such as a Nonce associated with the user device to a source base station. Handover of the user device from the source base station to a target base station may be accomplished based on the at least one encryption parameter to avoid the DoS attack.

34 Claims, 9 Drawing Sheets

SECURE DISTRIBUTED HANDOVER SIGNALING

CROSS REFERENCE TO RELATED APPLICATIONS

This application claims the benefit of U.S. Provisional Application No. 60/755,793 filed on Jan. 4, 2006, and which is incorporated herein by reference.

FIELD OF ART

The invention relates generally to communications networks. More specifically, the invention provides for security measures in a communication network.

BACKGROUND

Communication networks have gained great importance in information exchange. For example, a network for communication of mobile media content provides a scalable method for delivering media streams to a large number of clients. As the availability of network infrastructure increases, it becomes possible to implement the exchange and communication of enhanced media services.

In a typical network, a client connects to the network service. The service is expected to be available to the client when the client desires the service. However, in many cases, a user or organization may be deprived of the desired service due to a breach of the security of the system. For example, a denial of service (DoS) attack may occur that disrupts service provision or may even destroy programming or needed files in the system. Such DoS attacks may result in large costs in terms of both time and money.

In a typical DoS attack, a user is denied access to a desired resource. There are many types of DoS attacks but most have a common goal of depriving the victim of services or resources that the victim would be expected to have access to. Such attacks can result in loss in productivity and resources. Therefore, there exists a need for a method and system for preventing attacks on a communication system, preserving the integrity of the communication system, and/or ensuring proper data exchange in a communication network.

SUMMARY

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the more detailed description below.

In one example of the invention, a method is provided for a secured handover procedure for a mobile communication device. In one example, a measurement report including a Nonce associated with the mobile communication device is sent to a source base station. The source base station and a target base station may communicate context information.

In another example, the mobile communication device may confirm handover with the target base station. In another example, the target base station may forward signed and partially encrypted content to a core network for verification of handover messages.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope and spirit of the present invention.

Figure 1:
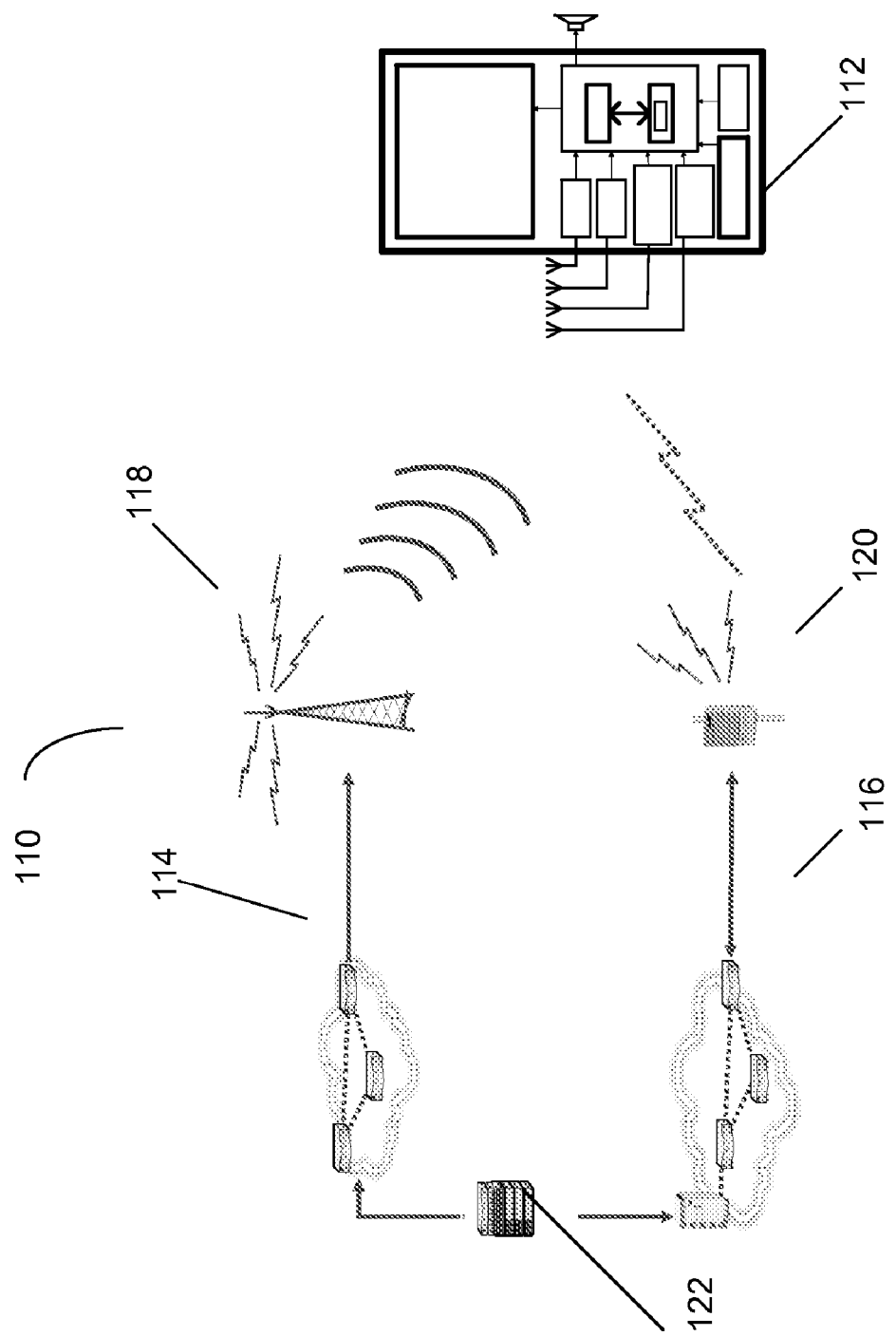
FIG. 1 illustrates a block diagram of a wireless communication system in which various aspects of the present invention may be implemented.

The present invention may be utilized across a broad array of networks and communication protocols. FIG. 1 illustrates an example of a wireless communication system 110 in which the systems and methods of the invention may be employed. One or more network-enabled mobile devices 112, such as a personal digital assistant (PDA), cellular telephone, mobile terminal, personal video recorder, portable television, personal computer, digital camera, digital camcorder, portable audio device, portable radio, or combinations thereof, are in communication with a service source 122 through a broadcast network 114 and/or cellular network 116. Although mobile devices are described, the present invention is not so limited. For example, aspects of the present invention may be provided in stationary devices. In an example of a stationary device, a backchannel for contacting the service providing entity may further be provided. The mobile terminal/device 112 may comprise a digital broadcast receiver device. The service source 122 may be connected to several service providers that may provide their actual program content or information or description of their services and programs to the service source that further provides the content or information to the mobile device 112. The several service providers may include but are not limited to one or more television and/or digital television service providers, AM/FM radio service providers, SMS/MMS push service providers, Internet content or access providers.

The broadcast network 114 may include a radio transmission of IP datacasting over DVB-H. The broadcast network 114 may broadcast a service such as a digital or analog television signal and supplemental content related to the service via transmitter 118. The broadcast network may also include a radio, television or IP datacasting broadcasting network. The broadcast network 114 may also transmit supplemental content which may include a television signal, audio and/or video streams, data streams, video files, audio files, software files, and/or video games. In the case of transmitting IP datacasting services, the service source 122 may communicate actual program content to user device 112 through the broadcast network 114 and additional information such as user right and access information for the actual program content through the cellular network 116.

The mobile device 112 may also contact the service source 122 through the cellular network 116. The cellular network 116 may comprise a wireless network and a base transceiver station transmitter 120. The cellular network may include a second/third-generation/fourth-generation (2G/3G/4G) cellular data communications network, a Global System for Mobile communications network (GSM), OMA broadcast networks, FLO, MBMS, or other wireless communication network such as a WLAN or WiMAX networks.

In one aspect of the invention, mobile device 112 may comprise a wireless interface configured to send and/or receive digital wireless communications within cellular network 116. The information received by mobile device 112 through the cellular network 116 or broadcast network 114 may include user selection, applications, services, electronic images, audio clips, video clips, and/or WTAI (Wireless Telephony Application Interface) messages. As part of cellular network 116, one or more base stations (not shown) may support digital communications with receiver device 112 while the receiver device is located within the administrative domain of cellular network 116.

Figure 2:
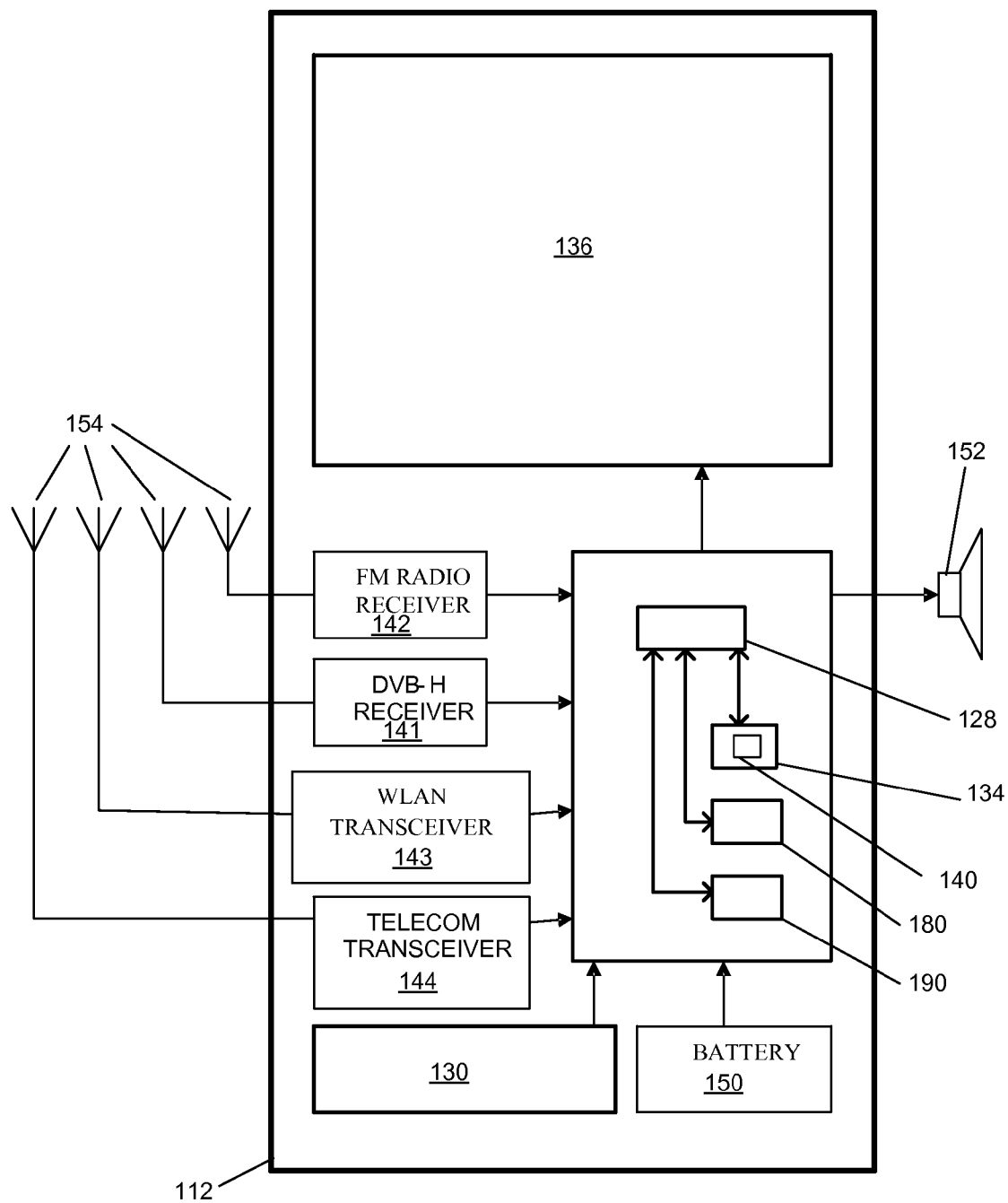
FIG. 2 illustrates a block diagram of a mobile terminal in accordance with an aspect of the present invention.

As shown in FIG. 2, mobile device 112 may include processor 128 connected to user interface 130, memory 134 and/or other storage, and display 136. Mobile device 112 may also include battery 150, speaker 152 and antennas 154. User interface 130 may further include a keypad, touch screen, voice interface, four arrow keys, joy-stick, data glove, mouse, roller ball, touch screen, or the like. In addition, the mobile device 112 may include a parsing module 180 for receiving information in a service guide (i.e., ESG fragment) and parsing the information to determine elements, sub-elements and attributes for compiling a service/interaction offering or message template. Also, the mobile device 112 may include a template compiler 190 for compiling a message template based on the attributes or sub-elements in the ESG fragment.

Computer executable instructions and data used by processor 128 and other components within mobile device 112 may be stored in a computer readable memory 134. The memory may be implemented with any combination of read only memory modules or random access memory modules, optionally including both volatile and nonvolatile memory, wherein some of the memory modules may be detachable. Software 140 may be stored within memory 134 and/or storage to provide instructions to processor 128 for enabling mobile device 112 to perform various functions. Alternatively, some or all of mobile device 112 computer executable instructions may be embodied in hardware or firmware (not shown).

Mobile device 112 may be configured to receive, decode and process transmissions based on the Digital Video Broadcast (DVB) standard, such as DVB-H or DVB-MHP, through a specific DVB receiver 141. Additionally, receiver device 112 may also be configured to receive, decode and process transmissions through FM/AM Radio receiver 142, WLAN transceiver 143, and telecommunications transceiver 144. Further the mobile device may be configured to receive transmissions based on the Digital Audio Broadcasting (DAB) standard (not shown). In one aspect of the invention, mobile device 112 may receive radio data stream (RDS) messages.

In an example of the DVB standard, one DVB 10 Mbit/s transmission may have 200, 50 kbit/s audio program channels or 50, 200 kbit/s video (TV) program channels. The mobile device 112 may be configured to receive, decode, and process transmission based on the Digital Video Broadcast-Handheld (DVB-H) standard or other DVB standards, such as DVB-MHP, DVB-Satellite (DVB-S), DVB-Terrestrial (DVB-T) or DVB-Cable (DVB-C). Similarly, other digital transmission formats may alternatively be used to deliver content and information of availability of supplemental services, such as ATSC (Advanced Television Systems Committee), NTSC (National Television System Committee), ISDB-T (Integrated Services Digital Broadcasting-Terrestrial), DAB (Digital Audio Broadcasting), DMB (Digital Multimedia Broadcasting) or DIRECTV. Additionally, the digital transmission may be time sliced, such as in DVB-H technology. Time-slicing may reduce the average power consumption of a mobile terminal and may enable smooth and seamless handover. Time-slicing consists of sending data in bursts using a higher instantaneous bit rate as compared to the bit rate required if the data were transmitted using a traditional streaming mechanism. In this case, the mobile device 112 may have one or more buffer memories for storing the decoded time sliced transmission before presentation.

Figure 3:
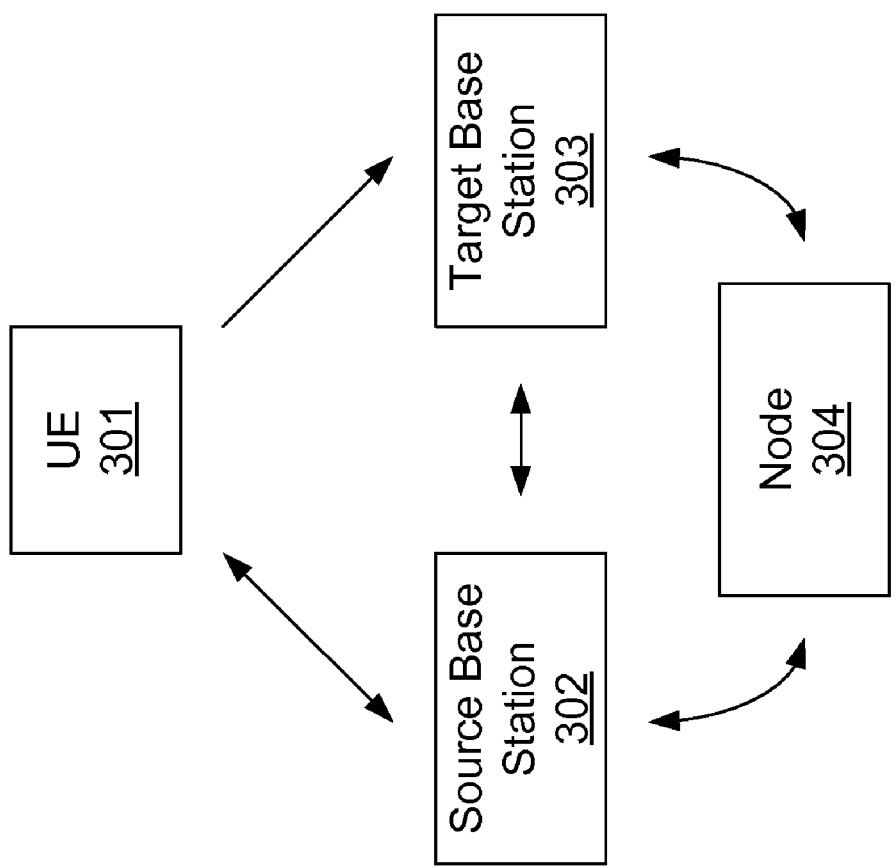
FIG. 3 illustrates a system in which a handover decision to a target device may be derived via a corresponding evolved node-B (eNB) or base station in accordance with an aspect of the present invention.

FIG. 3 illustrates a system in which user equipment (UE), such as a mobile communication device, may derive a handover decision to a target device via a corresponding evolved node-B (eNB) or base station. As illustrated in the example of FIG. 3, user equipment (UE) 301 may interact with a first base station 302 to transmit a measurement report to the first base station 302. The measurement report may include, for example, a nonce (i.e., a parameter that may vary with time that may limit or prevent unauthorized access to data) corresponding to the ULE 301. The UE 301 may further communicate with a second base station 303. For example, the UE 301 may transmit a message to the second base station 303 to confirm a handover. The message to confirm the handover may include a variety of parameters.

Also, the first base station 302 and the second base station 303 may communicate during the handover. For example, the first base station 302 may transmit a message to the second base station 303 to provide the context of handover in an associated message. The context information may further be encrypted to protect against eavesdroppers between the first base station 302 and the second base station 303. For example, the context information may be encrypted with a UE specific protection key that may be shared among the first base station 302, the second base station 303, and any base station listed in the context information of the UE 301. The UE specific protection used to encrypt the context information may be transported in an encrypted form (encrypted for the second eNB (e.g., second base station 303) by a third node 304 in the context information. The context information may also include other keying material that is encrypted to the second base station by a third node in the network 304. This other keying material may be used to create encryption and integrity protection keys for the session between UE and the second node.

Figure 4:
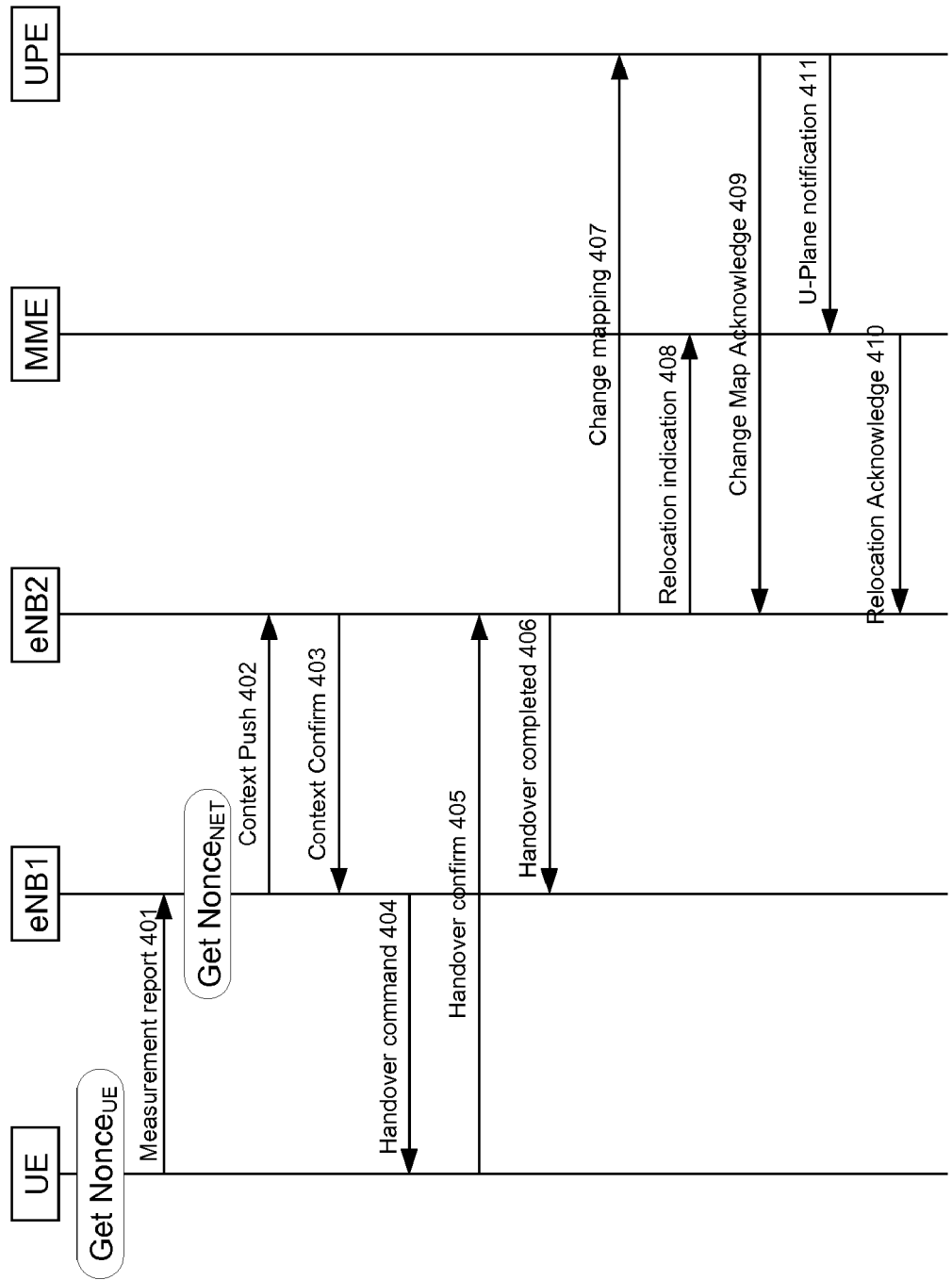
FIG. 4 is a diagram illustrating an example of proactive intra-radio access handoff security in accordance with an aspect of the present invention.
Figure 5:
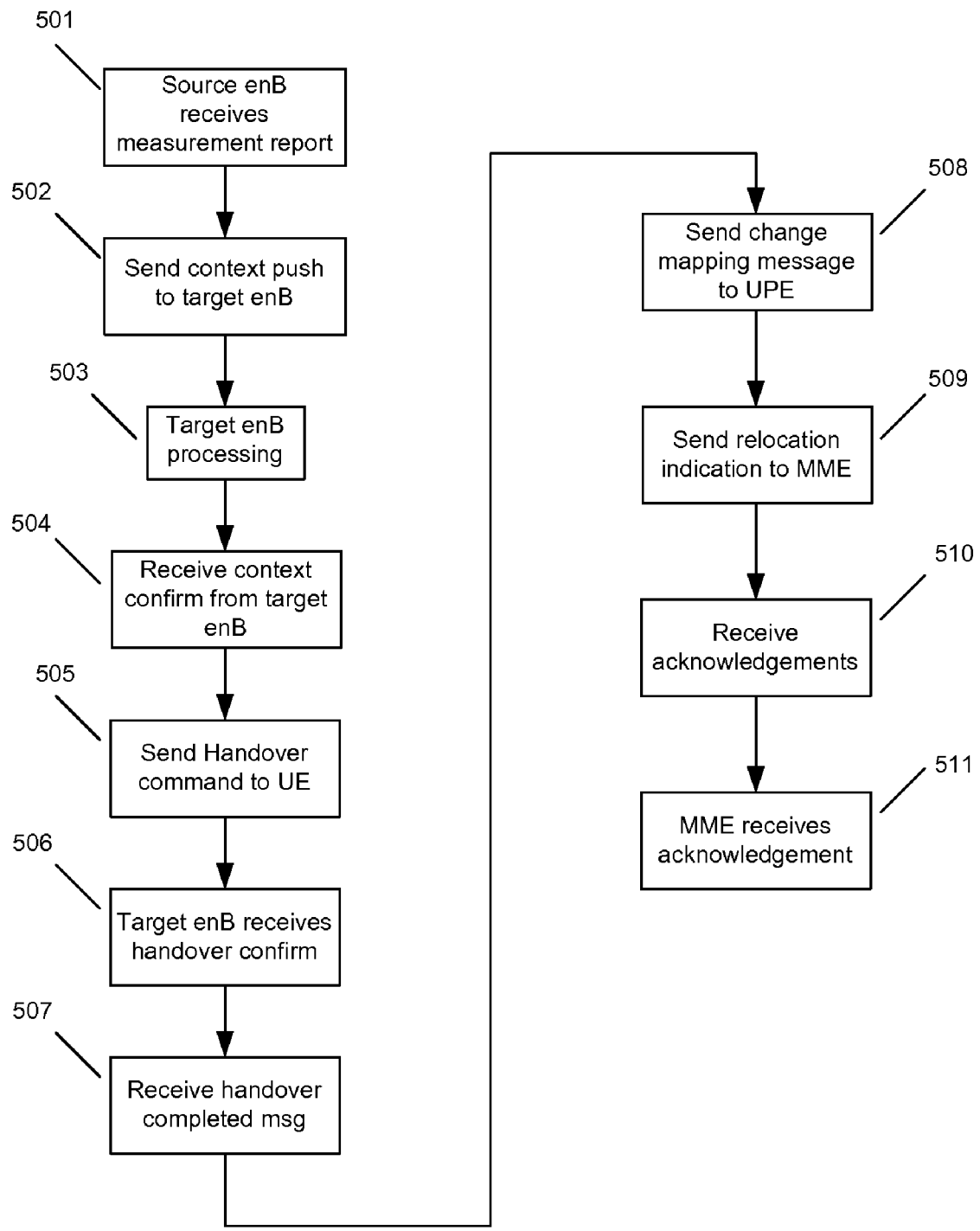
FIG. 5 is a flowchart illustrating the example of proactive intra-radio access handoff security of FIG. 4 in accordance with an aspect of the present invention.

FIGS. 4 and 5 illustrate one example of proactive intra-radio access handoff security. In this example, a UE 301 is operatively connected to a source base station (eNB1) 302. The UE 301 sends a measurement report to eNB1 302 to initiate a handover to a target device. In this example, the target device is operatively connected to a target base station (eNB2) 303. The measurement report may be a signed measurement report that may contain a nonce corresponding to the UE 301 (Nonce$_{UE}$). The Nonce$_{UE}$ may further be a new Nonce$_{UE}$ that has not been previously used to create a key for encryption.

The source base station 302 may receive the measurement report (401, STEP 501) including the Nonce$_{UE}$ and may derive a handover decision to the target base station 303 based on the received measurement report and Nonce$_{UE}$. Hence, in this example, the source base station 302 initiates a handoff procedure for the UE 301 based on the measurement report from the UE 301. The source base station 302 may generate a message (e.g., a context push message) to initiate the handoff procedure for UE 301 (402, STEP 502). The context push message may include Session Keys Context (SKC) that may be specific to UE 301. The context push message may further include the Nonce$_{UE}$ received by the source base station in the measurement report. In addition, the context push message may include identifiers for the source base station (e.g., ID$_{eNB1}$) and/or the target base station (e.g., ID$_{eNB2}$), as well as encryption associated parameters and information such as a Nonce$_{NET}$ generated at the source base station 302, a temporary identifier corresponding to the UE or UE_TID (UE temporary identifier) parameter and/or other RAN context information. This information may also be included in the context push message and may provide further security to the transmitted data. For example, the UE_TID and RAN context information may be encrypted to protect against eavesdroppers from intercepting messages communicated between the source base station 302 and the target base station 303. In one example, the UE_TID and RAN context information may be encrypted with a Session Keys Context Protection Key (SPK) that corresponds to the UE 301 (i.e., SPK$_{UE}$). The SPK$_{UE}$ may be a protection key that is shared among base stations that are included in the SKC of the UE 301 and may define the base stations authorized for data access. For example, each row in the SKC of the UE 301 may include the SPK$_{UE}$ encrypted for the corresponding base station.

Also in this example, the target base station 303 may receive the context push message from the source base station 302 (402, STEP 502). Based on the context push message received, the target base station 303 may process the information (STEP 503). For example, the target base station may check if the received message was correctly transmitted and received or whether the message received was actually targeted to the target base station. Verification of proper delivery of the message may be accomplished in a variety of ways. For example, the context push message may include an identification parameter, such as ID$_{eNB2}$, for identifying the target base station for receiving the corresponding message. Identifying the base station as the target base station may prevent the data packet from being replayed by an attacker for multiple base stations, for example.

The target base station may further verify the row of the SKC that is created for the target base station in the core network (CN) to verify the integrity protection of the context push message from the source base station. Also, the target base station may decrypt the corresponding SPK$_{UE}$ and may create a corresponding cipher key (CK) and/or integrity key (IK) for the corresponding UE 301 (e.g., CK$_{UE\_eNB2}$ and IK$_{UE\_eNB2}$) and may decrypt the UE_TID (UE temporary identity), nonce$_{UE}$, nonce$_{NET}$, and RAN context information received from the source base station.

Also, the target base station may create a cipher key (CK) and/or integrity key (IK) corresponding to the UE 301 (e.g., CK$_{UE\_eNB2}$ and IK$_{UE\_eNB2}$) for encrypting parameters of a data communication. For example, the target base station may create the CK$_{UE\_eNB2}$ and encrypt a Radio link identifier (e.g., RLID$_{eNB2}$), Context ID (CTXID$_{eNB2}$), and/or a UE_TID corresponding to the target base station. In another example, the target base station may create the CK and/or IK based on a SK$_{UE\_eNB2}$ in the SKC row for the target base station, and/or Nonce$_{UE}$, and/or Nonce$_{NET}$, and/or the UE_TID parameter. The content may thus be encrypted at the target base station and signed. Signing of the encrypted content may be accomplished, for example, with an integrity key (e.g., IK$_{UE\_eNB2}$), derived from a target base station identifier (e.g., ID$_{eNB2}$), and/or Nonce$_{UE}$ and/or Nonce$_{NET}$.

The target base station may further send a message (e.g., a context confirm message) to the source base station (403, STEP 504). The context confirm message may include, for example, the signed (e.g., Sign$_{UE\_eNB2}$\{<content>\}) and encrypted (e.g., Encrypt$_{UE\_eNB2}$\{<content>\}) contents which may include identifiers of the source and target base stations (e.g., ID$_{eNB1}$, ID$_{eNB2}$), Nonce$_{UE}$, NonceNet, as well as the Radio link identifier (RLID$_{eNB2}$) and/or the Context ID (CTXID$_{eNB2}$). The context confirm message may also be signed. For example, the context confirm message may be signed with an integrity key (e.g., IK$_{UE\_CTX}$) that may be derived from the SPK$_{UE}$.

As illustrated in the example of FIGS. 4 and 5, the source base station may receive the context confirm message from the target base station (STEP 504) and may further forward the content of the message in a handover command (404, STEP 505). The handover command message may include, for example, the Nonce$_{NET}$ and may further be signed with an integrity key (e.g., IK$_{UE\_eNB1}$) corresponding to the source base station and completely or partially signed with an integrity key (e.g. IK$_{UE\_eNB2}$) corresponding to the target bases station. The UE 301 may receive the handover command message and may verify the signature from the source base station and target base station. The UE 301 may thus receive parameters and data corresponding to the encrypted data including the Nonce$_{UE}$, Nonce$_{NET}$, AAA-Key, ID$_{eNB2}$ and UE_TID. Based on the received data, the UE 301 may derive the integrity key (IK) and the cipher key (CK) corresponding to the target base station (e.g., IK$_{UE\_eNB2}$ and CK$_{UE\_eNB2}$). The UE 301 may thus verify the signature from the target base station based on the IK and CK and decrypt the RLID$_{eNB2}$ and CTXID$_{eNB2}$ received.

The UE 301 may send a message to complete the handoff to the target base station. For example, the UE 301 may send a handover confirm message to the target base station (405, STEP 506). The Handover confirm message may include, for example, a signed and encrypted content created with keys shared between the UE 301 and the core network (CN) (e.g., IK$_{UE\_CN}$, CK$_{UE\_CN}$). Also, the handover confirm message may contain identification parameters for the source and target base stations (e.g., ID$_{eNB}$ or ID$_{eNB2}$), Nonce$_{UE}$, Nonce$_{NET}$, and/or UE_TID, which may also be encrypted such that UE_TID based location tracking may be prevented. The message content may further be signed for the source base station such that the source base station may check that the UE 301 was successfully connected to the target base station.

The target base station may receive the handover confirm message (STEP 506) and may forward the message as a confirmation message (e.g., Handover Completed message) to the source base station (406, STEP 507). The source base station receives the handover completed message and may verify the accuracy of the information in the handover completed message such as $Nonce_{UE}$, $Nonce_{NET}$ information of identification information of the base stations and that the information originated from the UE 301.

In addition, the signed and/or encrypted information may be further forwarded to the core network (including the mobility management entity (MME) and/or user plane entity (UPE)). For example, the message may be used as verification in the core network for the handover messages. In this example, the target base station may send a signed and encrypted message (e.g., a Change Mapping message) to the UPE (407, STEP 508) or may send a signed and encrypted (e.g., a relocation indication message) to the MME (408, STEP 509). The change mapping message and/or the relocation indication message may contain the handover confirm message that was signed and partially encrypted for the core network. The messages may further include the UE_TID.

The target base station may receive an acknowledgement message from the UPE (409, STEP 510) and/or the MME (410, STEP 510) responsive to the change mapping message and the relocation indication message, respectively. In addition, the UPE may notify the MME (411, STEP 511).

In this example, the signature of the UE in the message may prevent a hijacked base station from spoofing location updates to the core network (CN) such as to the MME or UPE. Also, the signed message prevents an attacker from injecting a location update message to the core network (CN, MME, UPE). In another example, the hijacked base station may not replay the location update messages and may not launch DoS attacks against other base stations or to the core network.

Figure 6:
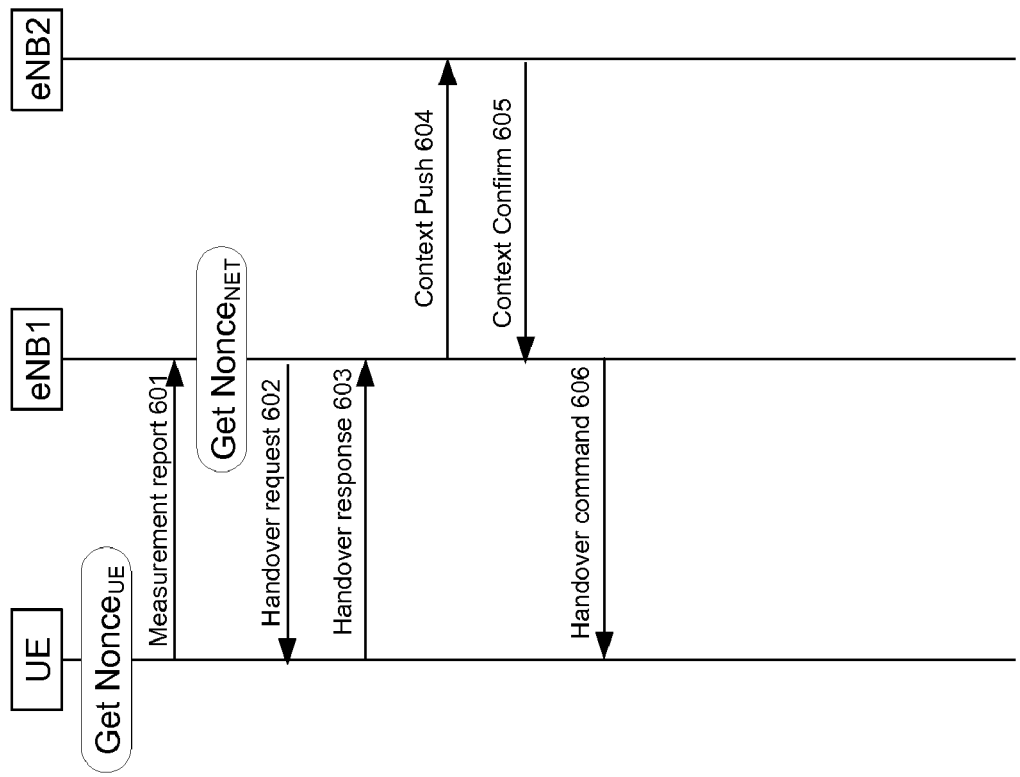
FIG. 6 a diagram illustrating an example of proactive security handover with new round trip in accordance with an aspect of the present invention.
Figure 7:
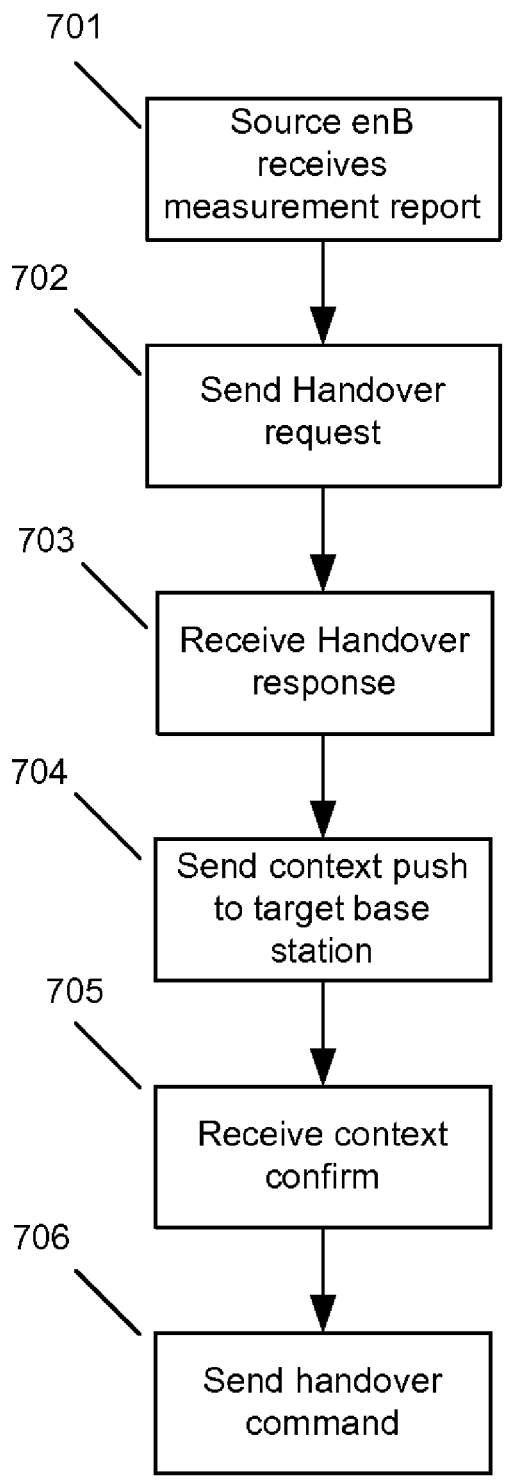
FIG. 7 is a flowchart illustrating the example of proactive security handover with new round trip of FIG. 6 in accordance with an aspect of the present invention.

FIGS. 6 and 7 illustrate another example of proactive handover with new round trip. In this example, the source base station may receive a measurement report from the UE 301 including a $Nonce_{UE}$ (601, STEP 701). The source base station may generate a $Nonce_{NET}$ and send a message (e.g., a handover request message) to the UE 301 responsive to the measurement report received from the UE 301 (602, STEP 702) and/or as an indication of handoff preparation to a target base station. The handover request may include the $Nonce_{UE}$ received from the UE 301 and the $Nonce_{NET}$. Also, the handover request may contain an identifier for the target base station (e.g., $ID_{eNB2}$).

The UE 301 may receive the handover request from the source base station (602) and may derive a corresponding session key associated with the UE 301 and the target base station (e.g., $SK_{UE\_eNB2}$). The session key may be based on any number of encryption associated parameters such as the identifier of the target base station ($ID_{eNB2}$), $Nonce_{UE}$, and/or $Nonce_{NET}$, UE_TID, etc.

The UE 301 may send a response message (e.g., handover response message) in response to the handover request message from the source base station (603, STEP 703). In this example, the handover response may include identifier information for the source base station (e.g., $ID_{eNB1}$), identifier information for the target base station (e.g., $ID_{eNB2}$), $Nonce_{UE}$, and/or $Nonce_{NET}$. In addition, the handover response message may be signed and/or at least partially encrypted.

The source base station may receive the handover response message from the UE 301 (STEP 703) and may forward the message to the target base station (604, STEP 704). For example, the source base station may forward the message to the target base station in a context push message (STEP 704). The context push message may contain additional parameters as described above.

The target base station may receive the context push message from the source base station (604) and may process the message. For example, the target base station may verify that the receive message is intended for the target base station and may decrypt the SKC entry for the target base station. The target base station may also derive a cipher key (CK) and an integrity key (IK) associated with the UE 301. The CK and IK (e.g., $CK_{UE\_CTX}$ and $IK_{UE\_CTX}$) may be derived from the $SKP_{UE}$, for example. Also, the target base station may decrypt data received in the context push message. For example, the target base station may decrypt UE_TID, $Nonce_{UE}$, $Nonce_{NET}$, and RAN context received in the context push message from the source base station. In another example, the target base station may also derive CK and IK (e.g., $CK_{UE-eNB2}$ and $IK_{UE\_eNB2}$) based on encryption associated parameters (e.g., $SK_{UE-eNB2}$, $Nonce_{UE}$, $Nonce_{NET}$, UE_TID), may check the UE signature, may store the UE RAN context and SKC, and may reserve RLID and CTXID associated with the target base station (e.g., $RLID_{eNB2}$, $CTXID_{eNB2}$). The target base station may send a message (e.g., context confirm message) to confirm the context to the source base station (605, STEP 705). For example, the target base station may send a context confirm message which may be signed and which may include identification information (e.g., $ID_{eNB1}$, $ID_{eNB2}$), $Nonce_{UE}$, $Nonce_{NET}$, and encryption information such as UE_TID, $CTXID_{eNB2}$, $RLID_{eNB2}$.

The source base station in this example may further send a message to the UE 301 responsive to the context confirm message. For example, the source base station may forward the context confirm message in a handover command to the UE (606, STEP 706). The UE may receive the handover command and may verify the signatures of the source base station and the target base station. The UE 301 may also decrypt the new RLID and CTXID.

Figure 8:
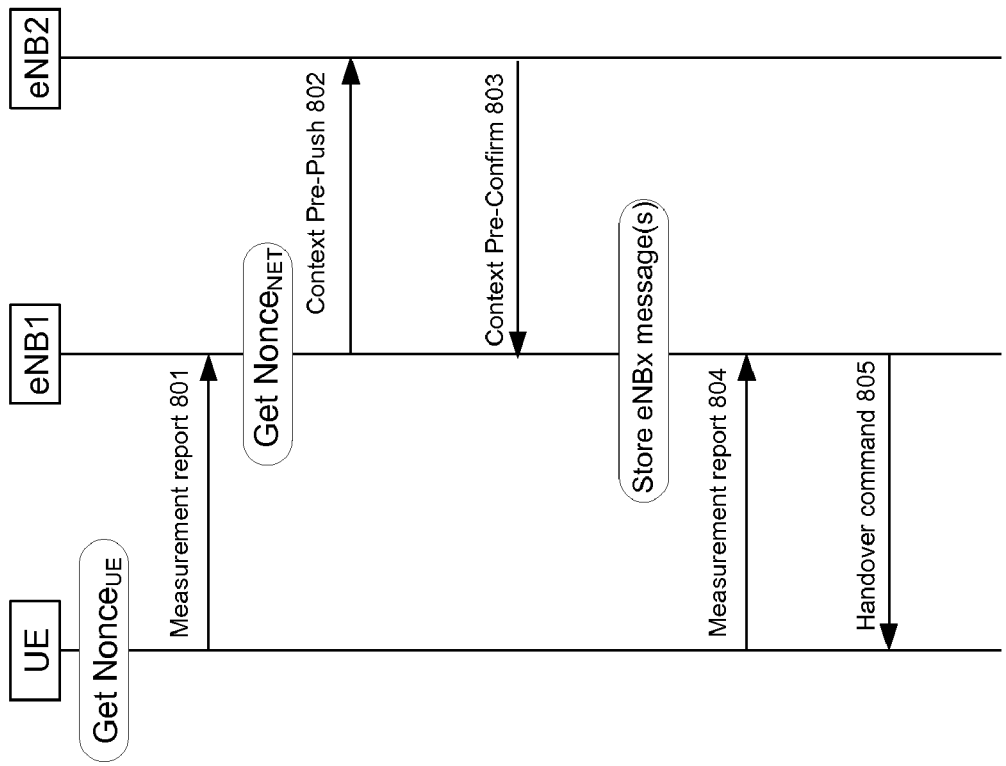
FIG. 8 a diagram illustrating an example of proactive handover with a pre-distributed SKC in accordance with an aspect of the present invention.
Figure 9:
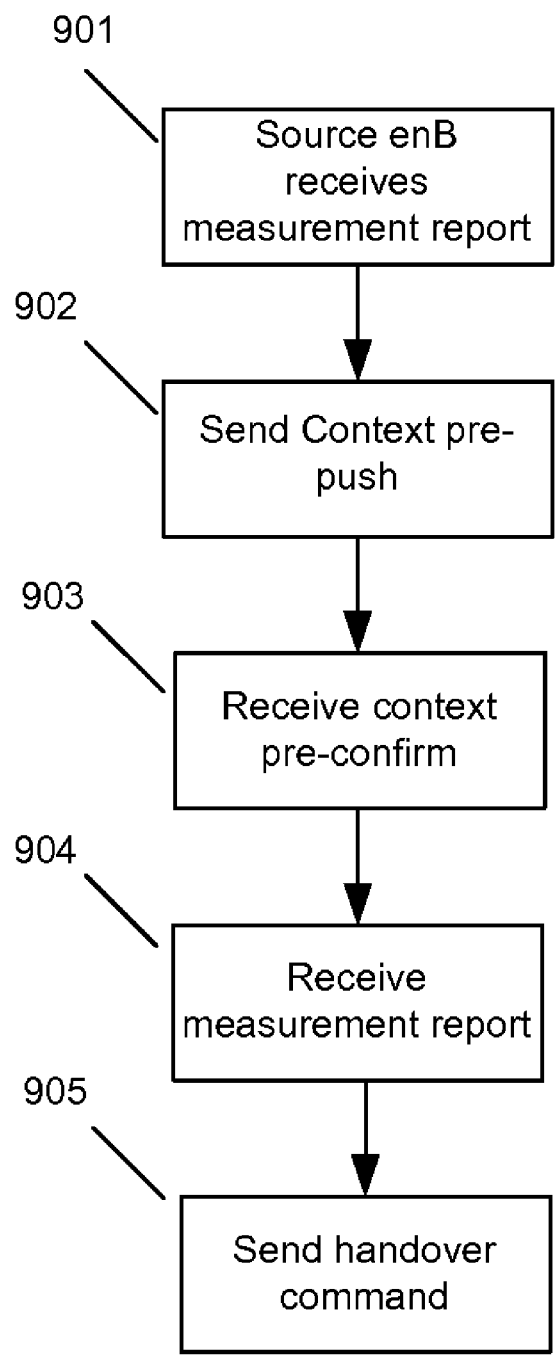
FIG. 9 is a flowchart illustrating the example of proactive handover with a pre-distributed SKC of FIG. 8 in accordance with an aspect of the present invention.

FIGS. 8 and 9 illustrate another example of proactive handover with a pre-distributed SKC and/or RAN context. In this example, the source base station may receive a measurement report from the UE 301 including a $Nonce_{UE}$ (801, STEP 901). The source base station may generate a $Nonce_{NET}$ and send a message (e.g., a Context pre-push message) to the target base station responsive to the measurement report received from the UE 301 (802, STEP 902). Alternatively, the context pre-push message may be independent of the measurement report from the UE 301. The source base station may send one or multiple messages (e.g. Context pre-push message) to one or multiple base stations for preparing the base station(s) to receive the UE if needed. The Context pre-push message may include the $Nonce_{UE}$ received from the UE 301 and the $Nonce_{NET}$. Also, the handover request may contain an identifier for the source base station (e.g., $ID_{eNB1}$), an identifier for the target base station (e.g., $ID_{eNBX}$), UE_TID, and or RAN context. If the Context-pre push message does not include an identifier of a base station to which the message is sent to, then it can be re-sent as-is to multiple base stations.

The target base station in this example receives the context pre-push message and may verify and decrypt the SKC entry for the target base station, derive a CK and IK (e.g., $CK_{UE\_CTX}$ and $ID_{UE\_CTX}$) from the $SKP_{UE}$ and verify the context push message. In addition, the target base station may decrypt the UE_TID, $Nonce_{UE}$, $Nonce_{NET}$, and the RAN context and may derive the CK and IK (e.g., $CK_{UE\_eNB2}$ and $IK_{UE\_eNBx}$) associated with the target base station based on the $SK_{UE\_eNBx}$, $Nonce_{UE}$, $Nonce_{NET}$, and UE_TID. Also, the target base station may store the UE RAN context and the SKC and reserve an RLID and CTXID associated with the target base station (e.g., $RLID_{eNBx}$ and $CTXID_{eNBx}$). The target base station may also send a context pre-confirm message to the source base station responsive to the context pre-push message. The context pre-confirm message may be signed and may be partially encrypted and may include identification information (e.g., $ID_{eNB1}$, $ID_{eNBX}$, $Nonce_{UE}$, $Nonce_{NET}$, UE_TID, $CTXID_{eNBx}$, or $RLID_{eNBx}$, for example.

The source base station may receive the context pre-confirm and may store the message(s) received. The source base station may then also receive a measurement report from the UE 301 including a $Nonce_{UE}$ and may locate the message(s) corresponding to the target base station resource message(s) responsive to the measurement report. The source base station may forward the context pre-confirm message to the UE 301 as a handover command responsive to receiving the measurement report. The UE 301 may receive the handover command and may derive $SK_{UE-eNBx}$ based on encryption parameters such as the AAA-Key, $ID_{eNBX}$, $Nonce_{UE}$, $Nonce_{NET}$, and/or UE_TID.

The present invention includes any novel feature or combination of features disclosed herein either explicitly or any generalization thereof. While the invention has been described with respect to specific examples including presently preferred modes of carrying out the invention, those skilled in the art will appreciate that there are numerous variations and permutations of the above described systems and techniques. Thus, the spirit and scope of the invention should be construed broadly as set forth in the appended embodiments.

I claim:

1. A method comprising:
sending a measurement report associated with a mobile communication device to a source base station, the measurement report including a first encryption parameter and wherein the measurement report is configured to cause the source base station to send a context push message to a target base station, wherein the context push message includes one or more encryption keys and a once associated with a network;
receiving, by the mobile communication device, a handover command including a second encryption parameter corresponding to the target base station from the source base station, wherein the mobile communication device is different from the target base station and the source base station; and
sending a handover confirmation message to the target base station, the handover confirmation message including identification information corresponding to at least one of the source base station and the target base station.

2. The method of claim 1 wherein the measurement report includes a the Nonce associated with the mobile communication device.

3. The method of claim 1 wherein the context push message further includes at least one of an identifier associated with the source base station, an identifier associated with the target base station, a Session Keys Context (SKC), a Nonce associated with a network, and a network context.

4. The method of claim 1 further comprising receiving contents of a context confirm message from the source base station.

5. The method of claim 4 wherein the mobile communication device determines a session key responsive to receiving the contents of the context confirm message.

6. The method of claim 5 wherein the handover confirmation message further includes at least one of: the Nonce associated with the mobile communication device and a Nonce associated with a network.

7. One or more computer readable media storing computer readable instructions that, when executed, cause an apparatus to:
send a measurement report associated with a mobile communication device to a source base station, the measurement report including a first encryption parameter and wherein the measurement report is configured to cause the source base station to send a context push message to the target base station, wherein the context push message includes one or more encryption keys and a Nonce associated with the mobile communication device;
receive a handover command including a second encryption parameter corresponding to a target base station from the source base station, wherein the apparatus is different from the target base station and the source base station; and
send a handover confirmation message to the target base station, the handover confirmation message including identification information corresponding to at least one of the source base station or the target base station.

8. The one or more computer readable media of claim 7 wherein the measurement report includes the Nonce associated with the mobile communication device.

9. The one or more computer readable media of claim 7 wherein the context push message further includes at least one of an identifier associated with the source base station, an identifier associated with the target base station, a Session Keys Context (SKC), a Nonce associated with a network, and a network context.

10. The one or more computer readable media of claim 7 further including instructions for receiving contents of a context confirm message from the source base station.

11. The one or more computer readable media of claim 10 wherein the mobile communication device determines a session key responsive to receiving the contents of the context confirm message.

12. The one or more computer readable media of claim 11 wherein the handover confirmation message further includes at least one of: the Nonce associated with the mobile communication device and a Nonce associated with a network.

13. An apparatus comprising:
at least one processor; and
at least one memory operatively coupled to the at least one processor and storing computer readable instructions that, when executed, cause the apparatus to:
send a measurement report to a source base station, the measurement report including a first encryption parameter and wherein the measurement report is configured to cause the source base station to send a context push message to a target base station, wherein the context push message includes one or more encryption keys and a Nonce associated with a mobile communication device;
receive a handover command including a second encryption parameter corresponding to the target base station from the source base station, the target base station and the source base station being different from the apparatus; and
send a handover confirmation message to the target base station, the handover confirmation message including identification information corresponding to at least one of: the source base station or the target base station.

14. The apparatus of claim 13, wherein the apparatus comprises the mobile communication device.

15. The apparatus of claim 13, wherein the memory further stores instructions for receiving contents of a context confirm message from the source base station.

16. The apparatus of claim 13, wherein the handover confirmation message further includes at least one of: the Nonce associated with the mobile communication device and a Nonce associated with a network.

17. One or more computer readable media storing computer readable instructions that, when executed, cause an apparatus to:
   receive, at a source base station, a measurement report associated with a mobile communication device, the measurement report including an encryption parameter;
   transmit a context push message to a target base station in response to receiving the measurement report, the context push message configured to initiate a handoff of the mobile communication device, and wherein the context push message includes one or more encryption keys and a Nonce associated with the mobile communication device;
   receive a context confirmation message from the target base station;
   transmit a handover command to the mobile communication device; and
   upon completion of the handover of the mobile communication device from the source base station to the target base station, receive a handover completion message from the target base station.

18. The one or more computer readable media of claim 17, further comprising instructions for transmitting a change mapping message to a core network including at least one of the mobility management entity (MME) and the user plane entity (UPE).

19. The one or more computer readable media of claim 17, further comprising instructions for transmitting a relocation indication message to a mobility management entity (MME) of a core network.

20. The one or more computer readable media of claim 17 wherein the context push message further includes at least one of an identifier associated with the source base station, an identifier associated with the target base station, a Session Keys Context (SKC), a Nonce associated with a network, and a network context.

21. The one or more computer readable media of claim 17 wherein the measurement report includes the Nonce associated with the mobile communication device.

22. The one or more computer readable media of claim 17 wherein the handover command includes a second encryption parameter identifying the target base station.

23. The one or more computer readable media of claim 17 wherein the context confirmation message further includes at least one of an identifier associated with the source base station, an identifier associated with the target base station, a Nonce associated with a network, a radio link ID associated with the target base station, and a context ID associated with the target base station.

24. The one or more computer readable media of claim 17 wherein the context confirmation message is signed by the target base station with an integrity key.

25. The one or more computer readable media of claim 24 wherein the integrity key is derived from an SKC Protection key (SPK) associated with the mobile communication device.

26. The one or more computer readable media of claim 17 wherein the context push message includes a network context.

27. An apparatus comprising:
   means for sending a measurement report to a source base station, the measurement report including a first encryption parameter and wherein the measurement report is configured to cause the source base station to send a context push message to a target base station, and wherein the context push message includes one or more encryption keys and a Nonce associated with a mobile communication device;
   means for receiving a handover command including a second encryption parameter corresponding to the target base station from the source base station, wherein the target base station and the source base station are different from the apparatus; and
   means for sending a handover confirmation message to the target base station, the handover confirmation message including identification information corresponding to at least one of: the source base station or the target base station.

28. The apparatus of claim 27, wherein the measurement report includes the Nonce associated with the mobile communication device.

29. A method comprising:
   receiving, by a source base station, a measurement report associated with a mobile communication device, the measurement report including an encryption parameter;
   transmitting a context push message to a target base station in response to receiving the measurement report, the context push message configured to initiate a handoff of the mobile communication device, and wherein the context push message includes one or more encryption keys and a Nonce associated with the mobile communication device;
   receiving a context confirmation message from the target base station;
   transmitting a handover command to the mobile communication device; and
   upon completion of the handover of the mobile communication device from the source base station to the target base station, receiving a handover completion message from the target base station.

30. The method of claim 29, further comprising transmitting a change mapping message to a core network including at least one of the mobility management entity (MME) and the user plane entity (UPE).

31. The method of claim 29, further comprising transmitting a relocation indication message to a mobility management entity (MME) of a core network.

32. An apparatus comprising:
   at least one processor; and
   at least one memory operatively coupled to the at least one processor and storing computer readable instructions that, when executed, cause the apparatus to:
      receive, at a source base station, a measurement report associated with a mobile communication device, the measurement report including an encryption parameter;
      transmit a context push message to a target base station in response to receiving the measurement report, the context push message configured to initiate a handoff of the mobile communication device, and wherein the context push message includes one or more encryption keys and a Nonce associated with the mobile communication device;
      receive a context confirmation message from the target base station;

transmit a handover command to the mobile communication device; and upon completion of the handover of the mobile communication device from the source base station to the target base station, receive a handover completion message from the target base station.

33. The apparatus of claim 32, the at least one memory further comprising instructions for transmitting a change mapping message to a core network including at least one of the mobility management entity (MME) and the user plane entity (UPE).

34. The apparatus of claim 32, the at least one memory further comprising instructions for transmitting a relocation indication message to a mobility management entity (MME) of a core network.

* * * * *

UNITED STATES PATENT AND TRADEMARK OFFICE
CERTIFICATE OF CORRECTION

| | | |
|---|---|---|
| PATENT NO. | : 7,864,731 B2 | Page 1 of 1 |
| APPLICATION NO. | : 11/616337 | |
| DATED | : January 4, 2011 | |
| INVENTOR(S) | : Dan Forsberg | |

It is certified that error appears in the above-identified patent and that said Letters Patent is hereby corrected as shown below:

Claim 1, Column 9, Line 43: "a once associated with a network;" should be corrected to "a Nonce associated with a network;"

Claim 2, Column 9, Line 55: "includes a the Nonce associated with the mobile communication device." has been changed to "includes the Nonce associated with the mobile communication device."

Signed and Sealed this
Thirteenth Day of September, 2011

David J. Kappos
*Director of the United States Patent and Trademark Office*